United States Patent
Kazoe et al.

(10) Patent No.: US 10,756,372 B2
(45) Date of Patent: Aug. 25, 2020

(54) PROTON CONDUCTOR AND FUEL CELL

(71) Applicant: JAPAN SCIENCE AND TECHNOLOGY AGENCY, Kawaguchi-shi (JP)

(72) Inventors: Yutaka Kazoe, Tokyo (JP); Yuriy Pihosh, Tokyo (JP); Kazuma Mawatari, Tokyo (JP); Takehiko Kitamori, Tokyo (JP); Kenji Kitamura, Ibaraki (JP); Takahiro Nagata, Ibaraki (JP); Osamu Tabata, Kyoto (JP); Toshiyuki Tsuchiya, Kyoto (JP)

(73) Assignee: JAPAN SCIENCE AND TECHNOLOGY AGENCY, Kawaguchi-shi (JP)

(*) Notice: Subject to any disclaimer, the term of this patent is extended or adjusted under 35 U.S.C. 154(b) by 600 days.

(21) Appl. No.: 15/519,617

(22) PCT Filed: Oct. 21, 2015

(86) PCT No.: PCT/JP2015/005311
§ 371 (c)(1),
(2) Date: Apr. 17, 2017

(87) PCT Pub. No.: WO2016/063537
PCT Pub. Date: Apr. 28, 2016

(65) Prior Publication Data
US 2017/0250430 A1     Aug. 31, 2017

(30) Foreign Application Priority Data
Oct. 23, 2014   (JP) .................... 2014-215905

(51) Int. Cl.
*H01M 8/08*       (2016.01)
*H01M 8/0293*   (2016.01)
*H01M 4/90*       (2006.01)

(52) U.S. Cl.
CPC ........... *H01M 8/08* (2013.01); *H01M 4/9016* (2013.01); *H01M 8/0293* (2013.01)

(58) Field of Classification Search
CPC ..... H01M 8/08; H01M 8/0293; H01M 4/9016
See application file for complete search history.

(56) References Cited

U.S. PATENT DOCUMENTS 9,963,363 B2 *   5/2018   Kim ..................... C02F 1/4691
2003/0232250 A1   12/2003   Nogami et al.
(Continued)

FOREIGN PATENT DOCUMENTS

JP   2004-30928 A    1/2004
JP   2004-146337  *  5/2004
(Continued)

OTHER PUBLICATIONS

English Machine Translation of JP 2004-146337 (Yr: 2004).*
(Continued)

*Primary Examiner* — Stephen J Yanchuk
(74) *Attorney, Agent, or Firm* — Oblon, McClelland, Maier & Neustadt, L.L.P.

(57) ABSTRACT

A first proton-donating layer (20a) is a layer having a proton-donative functional group on the surface, for example, a silicon oxide layer. A second proton-donating layer (20b) is also a layer having a proton-donative functional group on the surface, for example, a silicon oxide layer. Negative surface charges are formed on the main surface section of a first base (10a) and the main surface section of a second base (10b), and these negative charges increased the proton conductivity in an aqueous solution fed
(Continued)

to a nano channel. Although, in the aqueous solution, proton migration through hopping between water molecules contributes to its diffusion, the negative charges formed on the main surfaces of the bases (10a, 10b) attract protons in the aqueous solution, and the conduction of protons is efficiently achieved in "high-speed transfer regions" formed in the vicinity of the proton-donating layers (20a, 20b).

14 Claims, 10 Drawing Sheets

(56) References Cited

U.S. PATENT DOCUMENTS

| | | | |
|---|---|---|---|
| 2006/0105222 A1 | 5/2006 | Abd Elhamid et al. | |
| 2007/0037032 A1 | 2/2007 | Nishiyama et al. | |
| 2010/0266929 A1* | 10/2010 | Kanemoto | B01J 23/42 |
| | | | 429/488 |
| 2015/0290641 A1 | 10/2015 | Kitamori et al. | |

FOREIGN PATENT DOCUMENTS

| | | |
|---|---|---|
| JP | 2005-332801 A | 12/2005 |
| JP | 2006-85952 A | 3/2006 |
| JP | 2006-196290 A | 7/2006 |
| JP | 2008-520079 A | 6/2008 |
| JP | 2009-164099 A | 7/2009 |
| WO | 2014/051054 A1 | 4/2014 |

OTHER PUBLICATIONS

Decision to Grant a Patent dated Aug. 27, 2019 in Japanese Patent Application No. 2015-207235 (with English translation), 5 pages.
Hiroyuki Chinen, et al., "Enhancement of Proton Mobility in Extended-Nanospace Channels", Angewandte Chemie International Edition, vol. 51, pp. 3573-3577, (Jan. 25, 2012).
Takehiko Tsukahara, et al., "NMR Study of Water Molecules Confined in Extended Nanospaces", Angewandte Chemie International Edition, vol. 46, pp. 1180-1183, (Jan. 29, 2007).
International Search Report dated Jan. 26, 2016 in PCT/JP2015/005311 Filed Oct. 21, 2015.

* cited by examiner

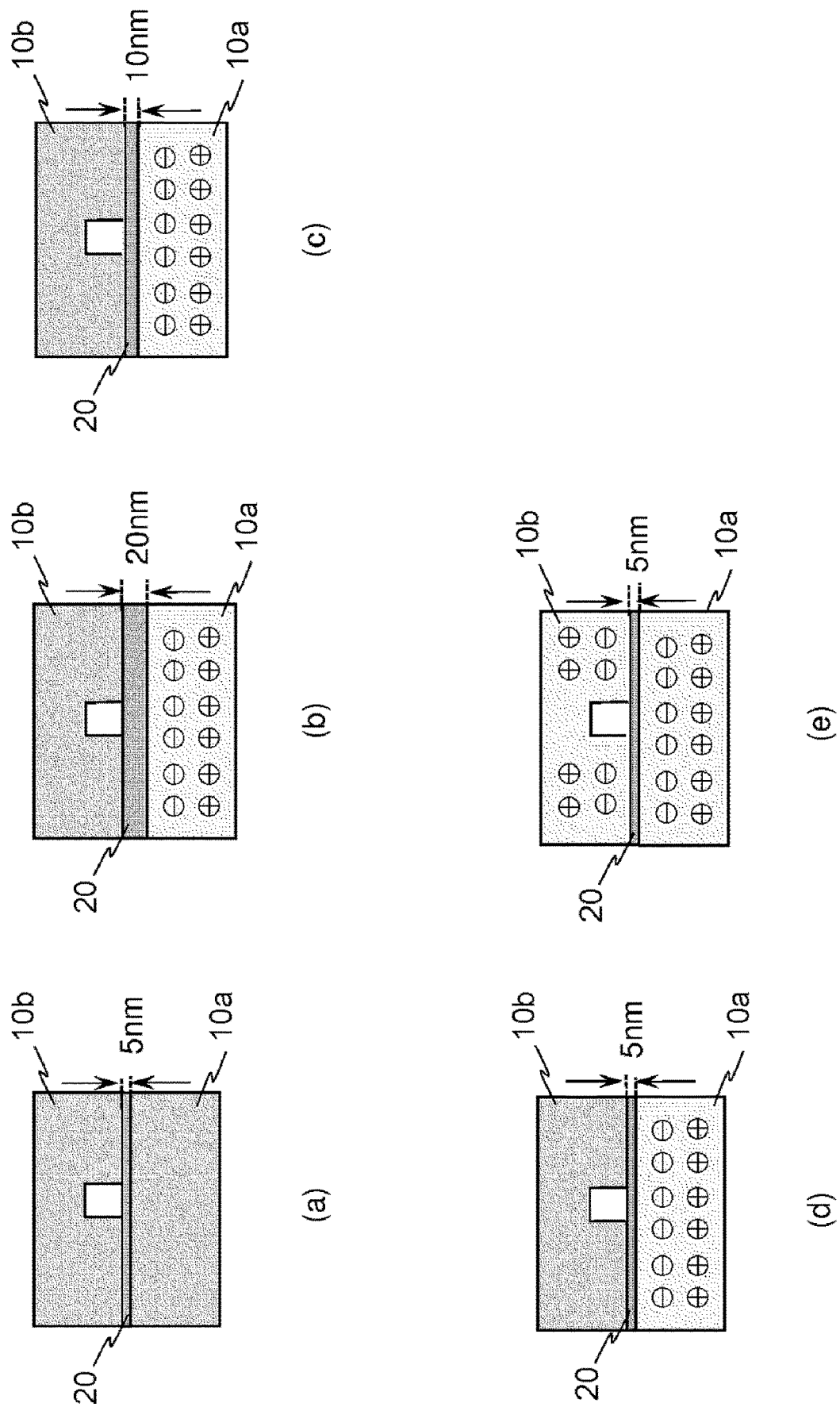

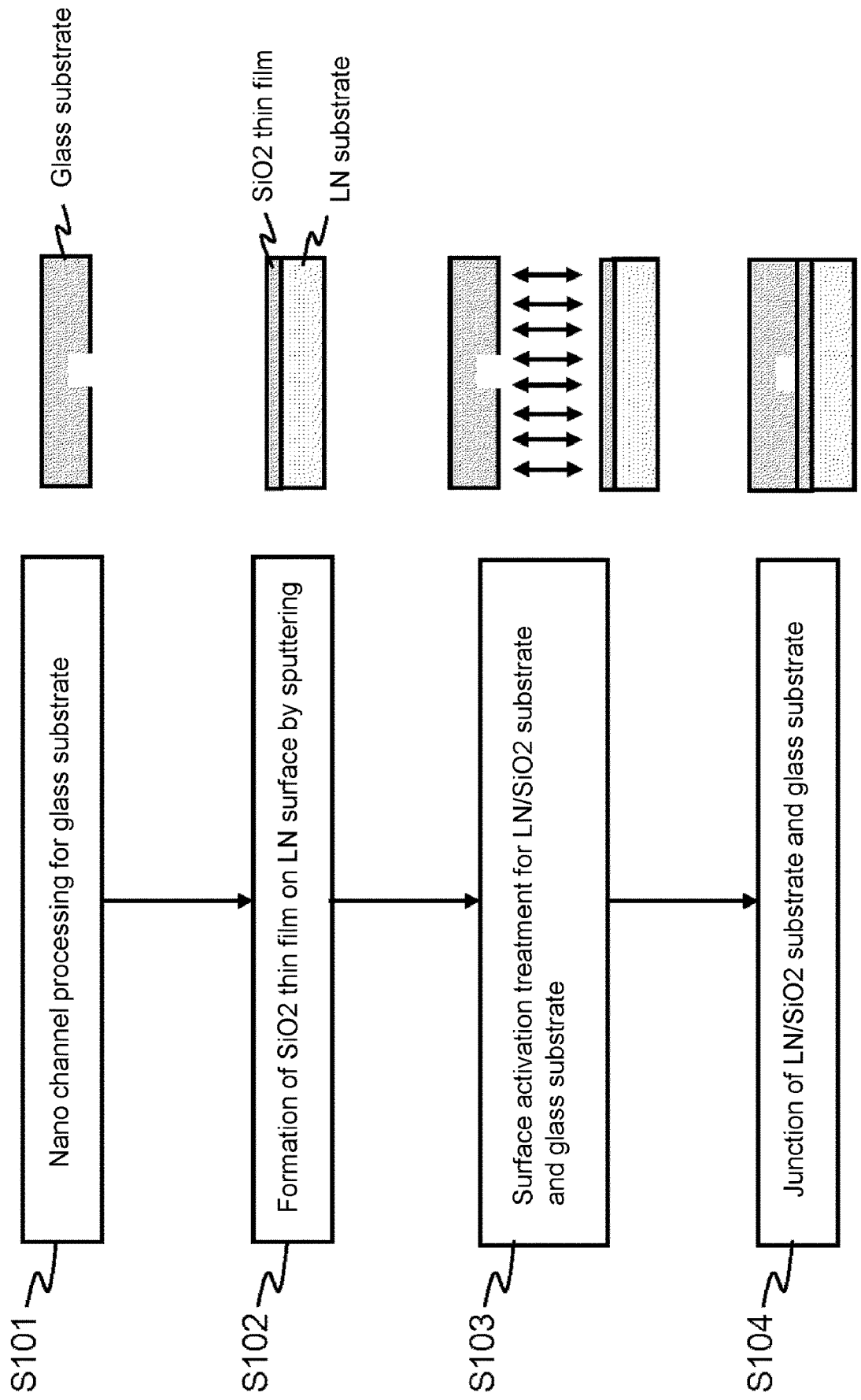

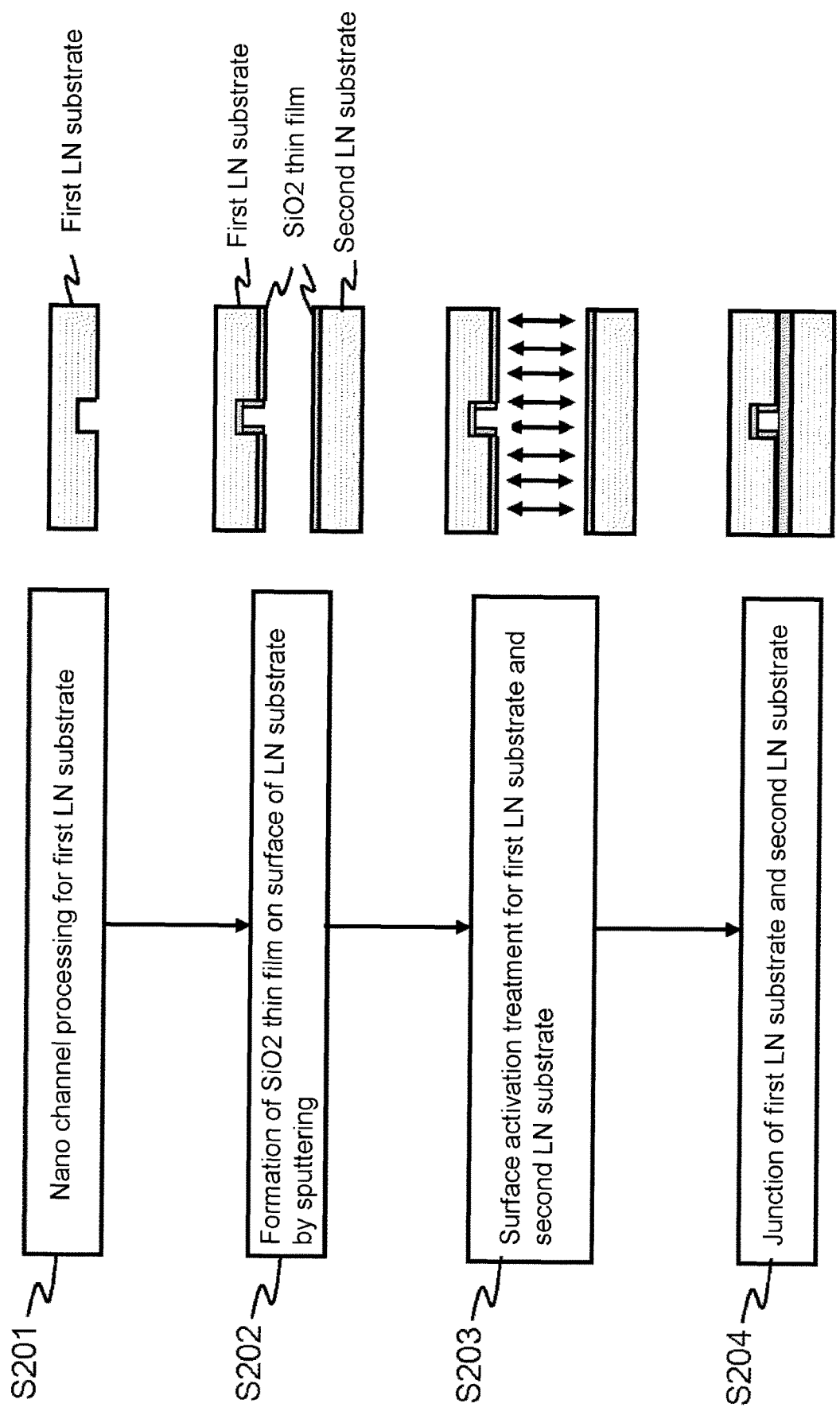

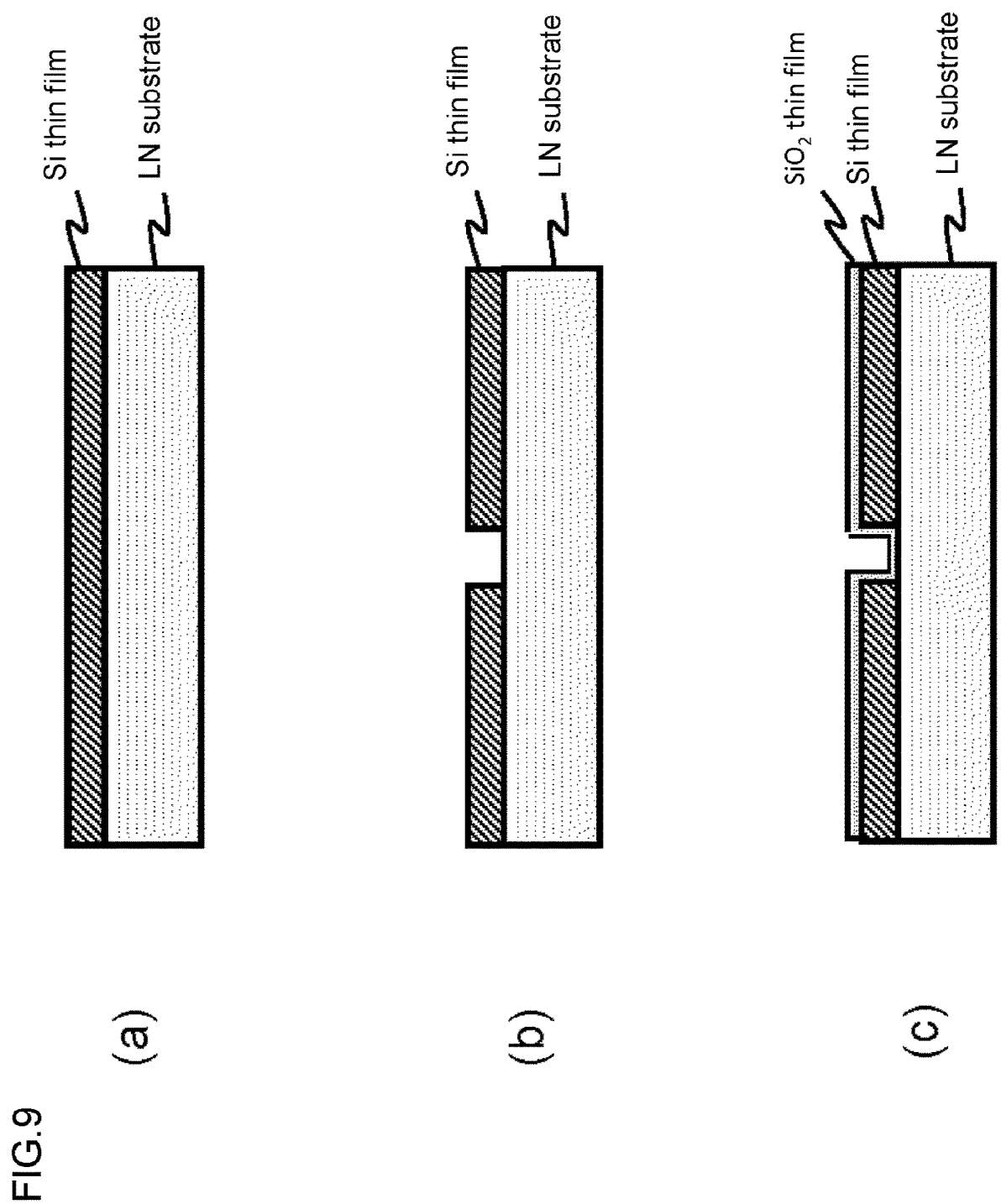

PROTON CONDUCTOR AND FUEL CELL

TECHNICAL FIELD

The present invention relates to a proton conductor which allowing high efficient proton transport in a nanospace, and a fuel cell based on the same proton conductor as an aqueous solution channel.

BACKGROUND ART

The hydrogen fuel cell has been attracting attention as a next-generation power source with low environmental load and high efficiency. The hydrogen fuel cell performance depends on a proton conductor, which transport the generated protons from the anode to the cathode side electrodes during its catalytic reaction.

Currently, polymer proton exchange membranes (PEM) are widely used as a proton conductor for fuel cells. However, PEM is not stable material in term of long-operation time at high temperature, which is required for faster proton mobility as result PEM is deteriorated and fuel crossover effect appears which latter leads to low device efficiency. There is fast-growing demand for hydrogen fuel cells as a next-generation power source, and the present invention has a great potential to replace PEM fuel cell in term of highly stable proton conductor that allows improving fuel cell performance. On the other hand, recent advances in nanotechnology have enabled to create functional devices, which are based on nanospace and provides an extraordinary high surface effect. With consideration of that, new ion-conduction devices are expected in the near future.

In view of such problems, Chinen et al. found that the proton diffusion coefficient of water increases by approximately one order of magnitude in a glass made nano channel (with its size of several hundred nanometers) and also demonstrated that glass made nano channel is mechanically/chemically stable and can be used as proton conductor with analogue to conventional PEM, but operated at ambient temperature condition (Non Patent Literature 1: Chinen et al., Angew. Chem. Int. Ed., 2012).

Tsukahara et al. reported increasing of proton conductivity in nano channel (with its size of a few hundreds nanometers) where water molecules are confined in such space and 3 phase model where proposed and suggests that structured water in 50 nm in the vicinity of a glass wall surface of a nano channel contributes to the enhanced proton diffusion (Non Patent Literature 2: Tsukahara et al., Angew. Chem. Int. Ed., 2007).

CITATION LIST

Non Patent Literature

Non Patent Literature 1: Chinen et al., Angew. Chem. Int. Ed., (2012)
Non Patent Literature 2: Tsukahara et al., Angew. Chem. Int. Ed., (2007)

SUMMARY OF INVENTION

Technical Problem

According to the above-mentioned model proposed by Tsukahara et al., it is considered to be effective for further increase of the proton conductivity in a nano channel to allow protons in the channel to localize in the vicinity of the wall and transport protons only in regions of structured water.

The present invention was made on the basis of the above-described findings, and the objective is to significantly increase the proton conductivity in a nano channel, and to provide a fuel cell as a next-generation of power source which are operated at ambient conditions with low environmental load and high efficiency by using glass made proton conductor as an aqueous solution channel.

Solution to Problem

In order to solve the problems mentioned above, a proton conductor according to the present invention includes: the first base formed a negative charge on a main surface, and a first proton-donating layer provided on the main surface of the first base, where the thickness of the first proton-donating layer is 20 nm or smaller.

The first proton-donating layer is preferably a layer having a proton-donative functional group on its surface Furthermore, the proton-donative functional group is preferably any one of a silanol group, a phosphate group, a titanol group, and a sulfone group.

For example, the first proton-donating layer is a silicon oxide layer.

As a preferred embodiment, the proton conductor could includes: a second base having a main surface facing the main surface of the first base, the second base having a negative charge which is formed on the main surface; and a second proton-donating layer which provided on the main surface of the second base, where the distance between the main surface of the first base and the main surface of the second base is 50 nm or more (800 nm or less).

The thickness of the second proton-donating layer is preferably ~20 nm or less.

Furthermore, the second proton-donating layer is preferably a layer having a proton-donative functional group on its surface.

Also, the proton-donative functional group is preferably any ones of a silanol group, a phosphate group, a titanol group, and a sulfone group.

For example, the second proton-donating layer is a silicon oxide layer.

In a preferred embodiment, at least one of the main surfaces of the first base and the second base comprises an electrode surface or a ferroelectric crystal, or each of the main surfaces of the first base and the second base comprises a ferroelectric crystal.

In such case, as example the ferroelectric crystal is lithium niobate.

As a preferred embodiment, the proton conductor could includes two side walls which are perpendicular to the main surface of the first base and to the main surface of the second base. In such way the aspect ratio is defined as R=L/d and equal to 6 or less, where L is the distance between the two side walls and d is distance between the main surfaces of the first base.

Each of the two side walls preferably includes a proton-donating layer on its surface.

A fuel cell according to the present invention is a fuel cell that include the above-described proton conductor as an aqueous solution channel.

Advantageous Effects of Invention

According to the present invention, usage of aqueous solution channel as a proton conductor, which includes a first base which have a negative charge formed on its main surface and a first proton-donating layer located on the main surface of the first base and its design should follow requirement on the thickness of the first proton-donating layer which is 20 nm or less, and allows to protons in the channel to localized in the vicinity of the wall and enables its transportation only in regions of structured water. Thereby, the proton conductivity in the nano channel can be significantly increased.

In addition, usage of an aqueous solution channel as a proton conductor can be applied for fuel cell applications to create a next-generation power source with low environmental load and high efficiency.

BRIEF DESCRIPTION OF DRAWINGS

FIG. 3A illustrates the configuration of a sample used to investigate the thickness-dependency, etc., of the proton diffusion coefficient in the case that the base main surface section capable of having negative charges formed by lithium niobate and the proton-donating layer is $SiO_2$ film.

FIG. 7 illustrates an example of a process for forming an aqueous solution channel with the proton conductor according to the present invention.

FIG. 8 illustrates another example of a process for forming an aqueous solution channel with the proton conductor according to the present invention.

FIG. 9 illustrates another example of nano channel processing for the main surface region of an LN substrate.

DESCRIPTION OF EMBODIMENTS

Hereinafter, a proton conductor according to the present invention will be described with reference to the accompanying drawings.

Figure 1:
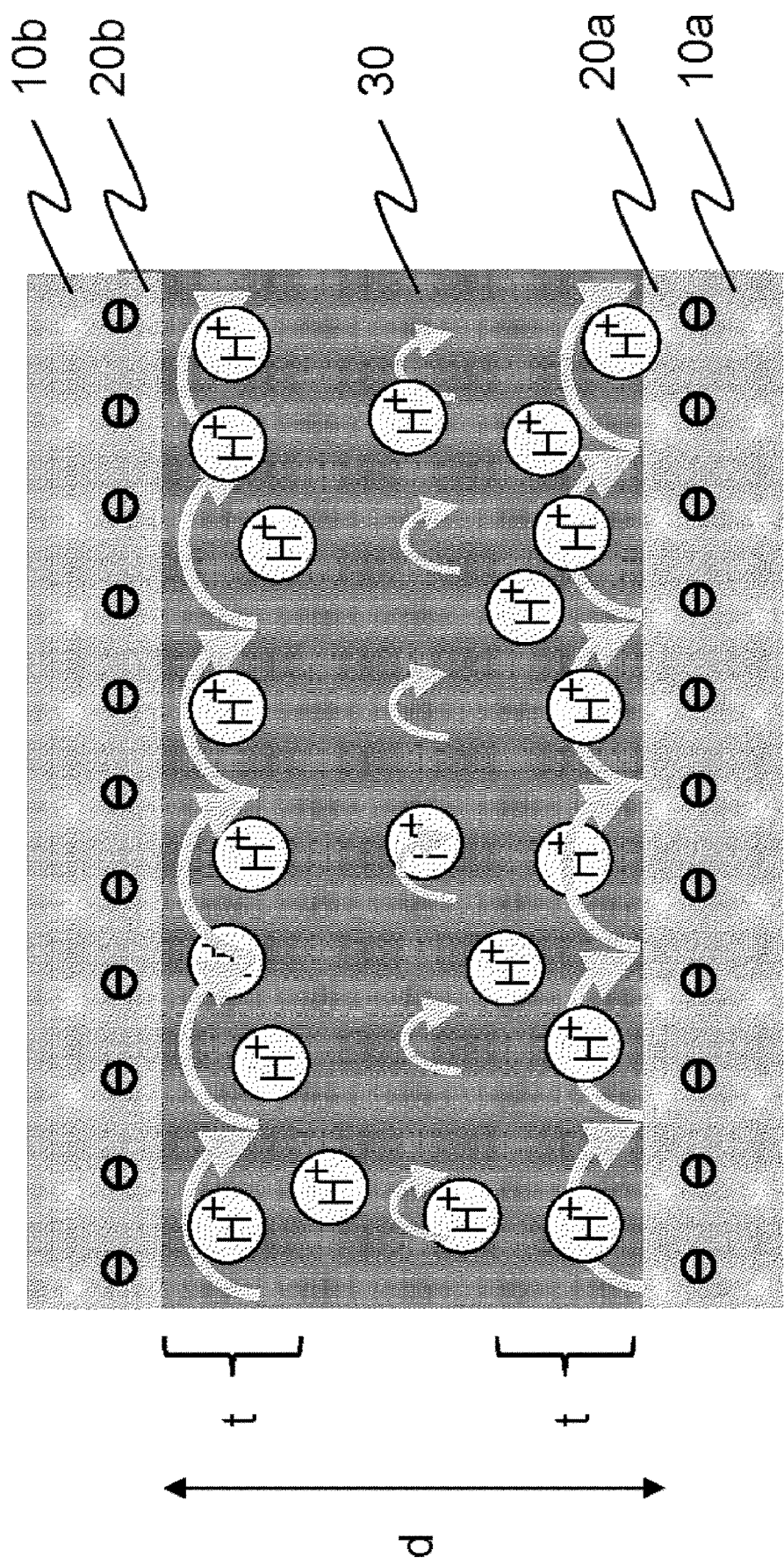
FIG. 1 conceptually illustrates a configuration example of the proton conductor according to the present invention.

FIG. 1 conceptually illustrates a configuration example of the proton conductor according to the present invention. This figure shows an embodiment in which two bases are disposed at a distance of a several hundred nanometers to form a nano channel.

Each of first and second bases (10a, 10b) is a base having a negative charge which is formed on its main surface. On the main surface of the first base 10a, a first proton-donating layer (20a) having, for example, a thickness of 20 nm or less. The second base (10b) has a main surface facing the main surface of the first base (10a), and a second proton-donating layer (20b) having, for example, a thickness of 20 nm or less is similarly provided on the main surface of the second base (10b). The distance d between the main surfaces of the first base (10a) and the second base (10b) is designed to be 50 nm or more and 800 nm or less, and the space between the bases serves as a channel for a protonic solvent 30.

The first proton-donating layer (20a) is a layer having a proton-donative functional group on the surface, and examples of the proton-donative functional group includes a silanol group, a phosphate group, a titanol group, and a sulfone group. As example, a first proton-donating layer (20a) is a silicon oxide layer.

The second proton-donating layer (20b) is also a layer having a proton-donative functional group on the surface, and examples of the proton-donative functional group includes a silanol group, a phosphate group, a titanol group, and a sulfone group, and the second proton-donating layer (20b) is a silicon oxide layer, as example.

As illustrated in FIG. 1, negative surface charges are formed on the main surface section of the first base (10a) and on the main surface section of the second base (10b), and these negative charges increase the proton conductivity in an aqueous solution fed in the nano channel. In the aqueous solution, proton migration through hopping between water molecules contributes to its diffusion, and the above-mentioned effect of proton conductivity increasing is achieved due to negative charges which are formed on the main surfaces of the bases (10a, 10b), attracted protons in the aqueous solution and effective conduction of protons is achieved in "high-speed transfer regions" formed in the vicinity of the proton-donating layers (20a, 20b).

The regions indicated as t in FIG. 1 are "high-speed transfer regions" for protons formed in the vicinity of the proton-donating layers (20a, 20b), and the thickness is considered to be roughly~50 nm.

Figure 2:
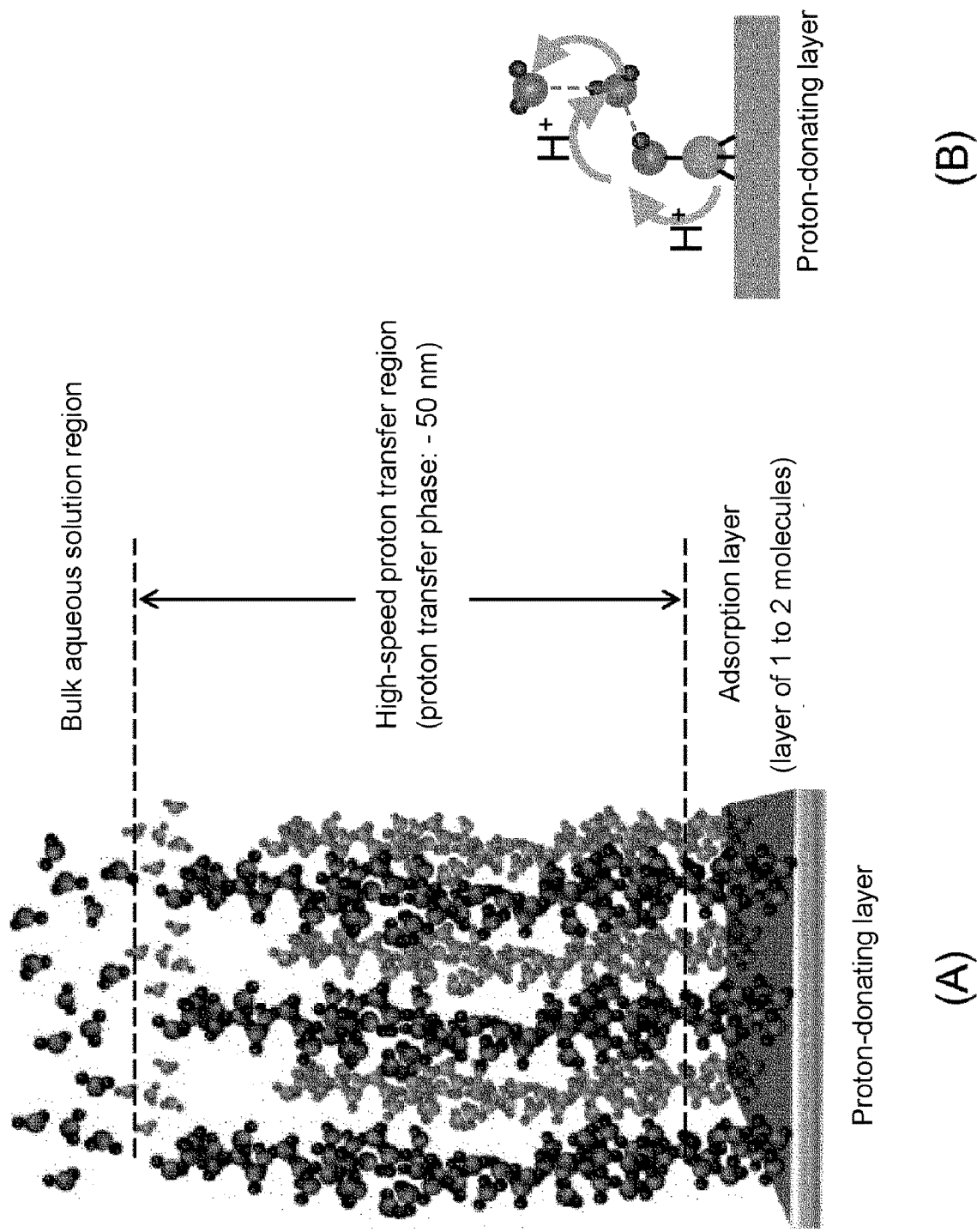
FIG. 2 conceptually illustrates a model of a proton migration phase formed in a nano channel.

FIG. 2 conceptually illustrates a model of a proton migration phase which is formed in the nano channel. In this model, an adsorption layer which is a layer of approximately 1 to 2 molecules is present on the surface of the proton-donating layer, such as fused silica glass as it illustrated in FIG. 2(A), and protons are donated to the aqueous solution through intermolecular interaction generated in the adsorption layer region as it illustrated in FIG. 2(B).

In the vicinity of the adsorption layer, a "high-speed transfer region" in a thickness corresponding to a layer of approximately 100 molecules (approx. 50 nm) is formed. The proton diffusion coefficient of the "high-speed transfer region" is approximately 20 times higher in comparison to the bulk aqueous solution region, and approximately seven times is higher in comparison to a solid polymer membrane. Accordingly, achievement of efficient conduction of protons in the "high-speed transfer region" leads to a significant increasing of the proton conduction efficiency in the nano channel.

The negative charges formed on the main surfaces of the bases (10a, 10b) illustrated in FIG. 1 attract protons in the aqueous solution (e.g., water) to the "high-speed transfer region" through the electrostatic potential, and allow protons to localize, which significantly increases the proton conduction efficiency in the nano channel.

Using, for example, an auto-polarizable material or an electrode, may form the base main surface section capable of having negative charges formed. In the other words, the base main surface section may be a ferroelectric crystal surface or an electrode surface, etc. Examples of ferroelectric crystals used for the base main surface section included lithium niobate.

Although the example illustrated in FIG. 1 shows an embodiment in which two bases are disposed at a distance of several hundred nanometers to form a nano channel, the present invention is not necessarily limited to this embodiment. High-speed protons transfer can be achieved only by designing the first proton-donating layer (20a) which provide the main surface of the first base (10a) with a preferred thickness. In the present invention, the preferred thickness for the proton-donating layer is 20 nm or less.

Figure 3B:
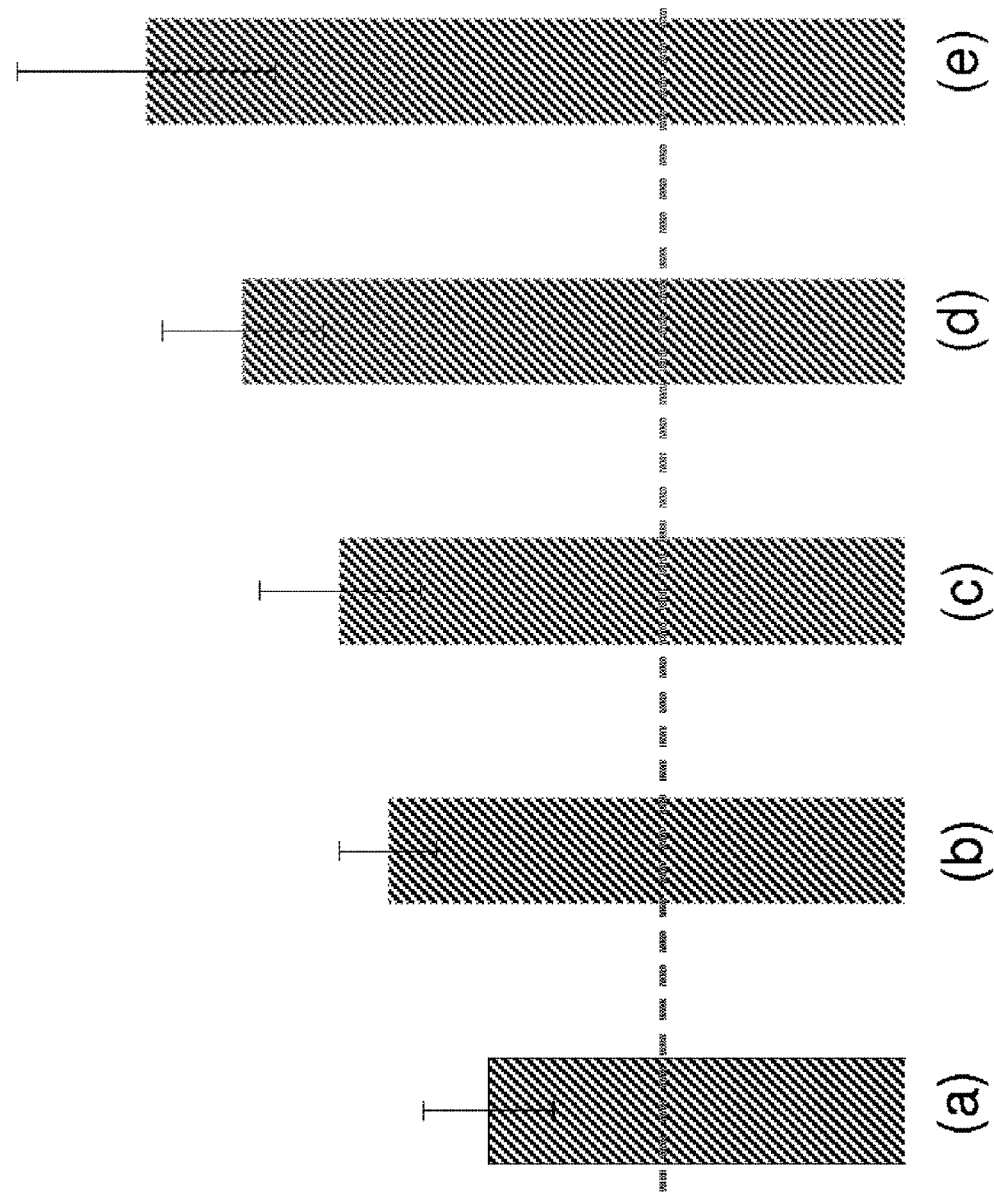
FIG. 3B illustrates results from investigation of the thickness-dependence, etc., of the proton diffusion coefficient in the case that the base main surface section capable of having negative charges formed by lithium niobate and the proton-donating layer is $SiO_2$ film.

FIG. 3A illustrates the configuration of a sample used to investigate the thickness-dependence, etc., of the proton diffusion coefficient in the case that the base main surface section capable of having negative charges formed is lithium niobate and the proton-donating layer is a silicon dioxide film ($SiO_2$ film), and FIG. 3B illustrates results from that investigation.

As samples for evaluation, as it illustrated in FIG. 3A, the sample (a) was obtained by producing a nano channel with a rectangular cross-section (300 nm×300 nm) on a first silica glass substrate and later it bonding with a second silica glass substrate previously pre-covered by $SiO_2$ layer with a thickness of 5 nm. The samples (b) to (d) were each obtained by forming a nano channel with a rectangular cross-section (300 nm×300 nm) on a silica glass substrate and laminating the resultant on a substrate of lithium niobate (LN), an auto-polarizable ferroelectric, having an $SiO_2$ layer with a thickness of 5 to 20 nm formed thereon. Furthermore, the sample (e) was obtained by forming a nano channel with a rectangular cross-section (300 nm×300 nm) on a first LN substrate and laminating the resultant on a second LN substrate having an $SiO_2$ layer with a thickness of 5 nm formed thereon. The nano channel of each of these samples was filled with water as a protic solvent, and the proton diffusion coefficient in the nanospace was evaluated by using a fluorescent pH probe. For comparison, a 1.6 μm micro channel which does not have the above-described effect of increasing the proton diffusion coefficient was prepared. The proton diffusion coefficient was represented as a dashed line in FIG. 3B.

FIG. 3B shows results from the proton diffusion coefficient evaluation from these five samples. The proton diffusion coefficient of the sample (a), in which the base (10a) was glass, (thickness of SIC, layer: 5 nm) was roughly $1.3×10^{-8}$ m²/s, which is almost the same as a previously reported value (Non Patent Literature 1). In contrast, the proton diffusion coefficient of the sample (d), in which the base (10a) was lithium niobate (LN), (thickness of $SiO_2$ layer: 5 nm) was roughly $2.0×10^{-9}$ m²/s, and the proton diffusion coefficient is 1.5 times higher or more in comparison to the sample (a). In addition, the proton diffusion coefficient of the sample (e), in which a first LN substrate where a nano channels are formed is bonded with a second LN substrate (both substrates where pre-covered by $SiO_2$ layer with its thickness of 5 nm before the bonded process), was approximately $2.3×10^{-8}$ m²/s, and this value is 1.8 times higher vs. to the sample (a).

The proton diffusion coefficients of the sample (b) (thickness of SIC, layer: 20 nm) and the sample (c) (thickness of $SiO_2$ layer: 10 nm), where the base (10a) was lithium niobate (LN) and the proton-donating layer 20 was an $SiO_2$ layer with a larger thickness, were $1.6×10^{-9}$ m²/s and $1.75×10^{-9}$ m²/s, respectively, and these results are 1.2 to 1.4 times higher in comparison to the sample (a). The experimental results from samples (b) to (d) indicate that the effect of increasing the proton diffusion coefficient of a proton-donating layer directly depends on $SiO_2$ thickness.

The proton diffusion coefficient of the sample (a) was approximately twice as high as the value measured for the 1.6 μm micro channel which does not have the effect of increasing the proton diffusion coefficient. On the other hand, the sample (d), in which the ferroelectric LN was used for the base, a proton diffusion coefficient approximately three times higher than that in the 1.6 μm micro channel, and the sample (e), which was obtained by bonding LN substrates together, had a proton diffusion coefficient approximately 3.3 times higher than that in the 1.6 μm micro channel.

Figure 4:
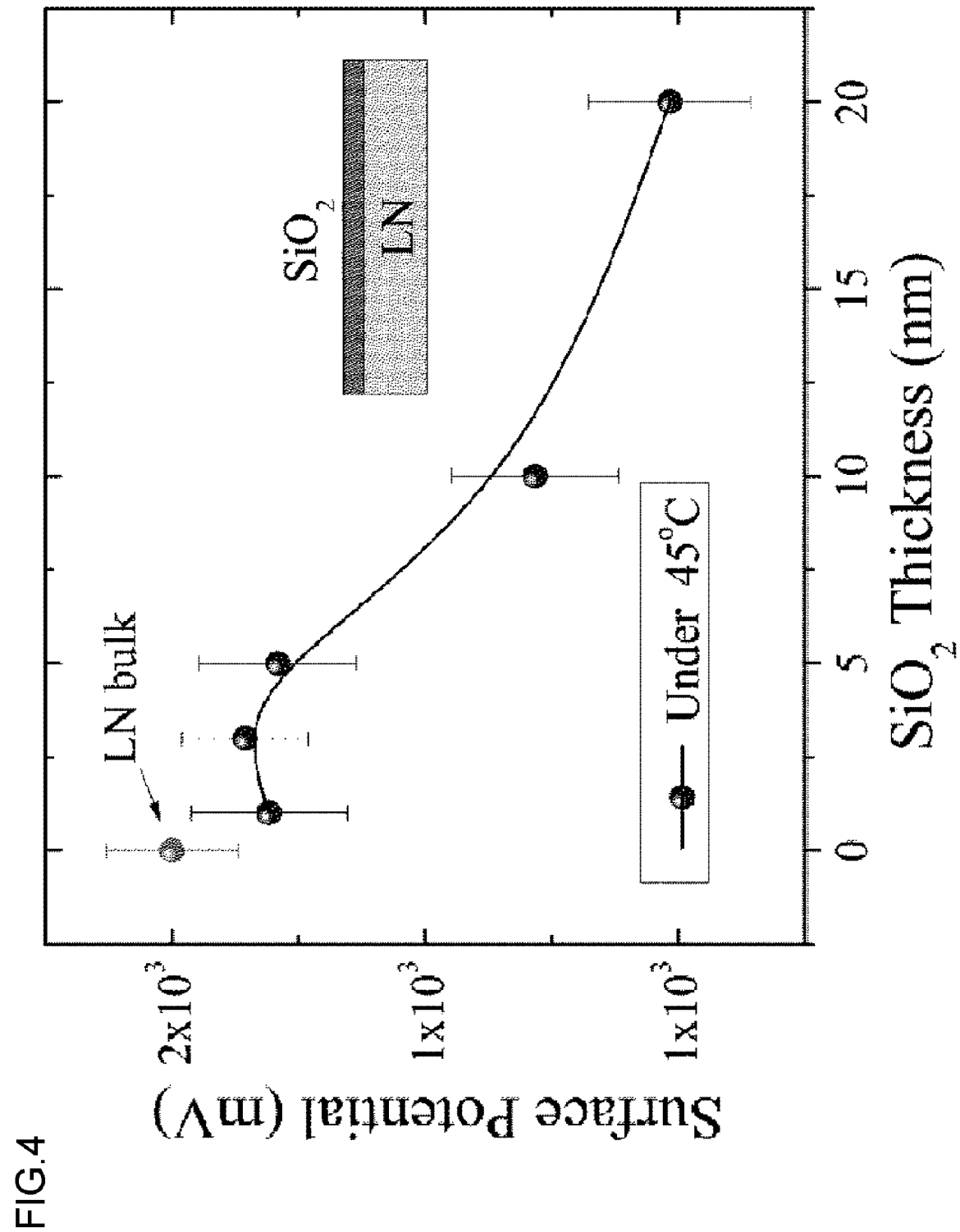
FIG. 4 shows the $SiO_2$ film thickness-dependency of the surface potential $\Phi_s$ of the proton-donating layer in the case that the base main surface section capable of having negative charges formed by lithium niobate and the proton-donating layer is $SiO_2$ film.

FIG. 4 shows the $SiO_2$ film thickness-dependence of the surface potential $\Phi_s$ of the proton-donating layer in the case that the base main surface section is lithium niobate capable of forming negative charges and the proton-donating layer is $SiO_2$ film.

In the results shown in the figure, the surface potential $\Phi_s$ of the proton-donating layer exhibited the maximum value at a thickness of 3 nm, and significantly increased as the thickness decreased to smaller than 20 nm of $SiO_2$ layer, and in particular exhibited extremely high values at thicknesses of 5 nm or less. This suggests that designing the thickness of the proton-donating layer to be 20 nm or less can increase the surface potential $\Phi_s$ of the proton-donating layer.

As the surface potential $\Phi_s$ of the proton-donating layer becomes higher, the above-described localization of protons occurs and protons are attracted to the "high-speed transfer region", which enhances the effect of increasing the proton conduction efficiency in the nano channel.

Figure 5:
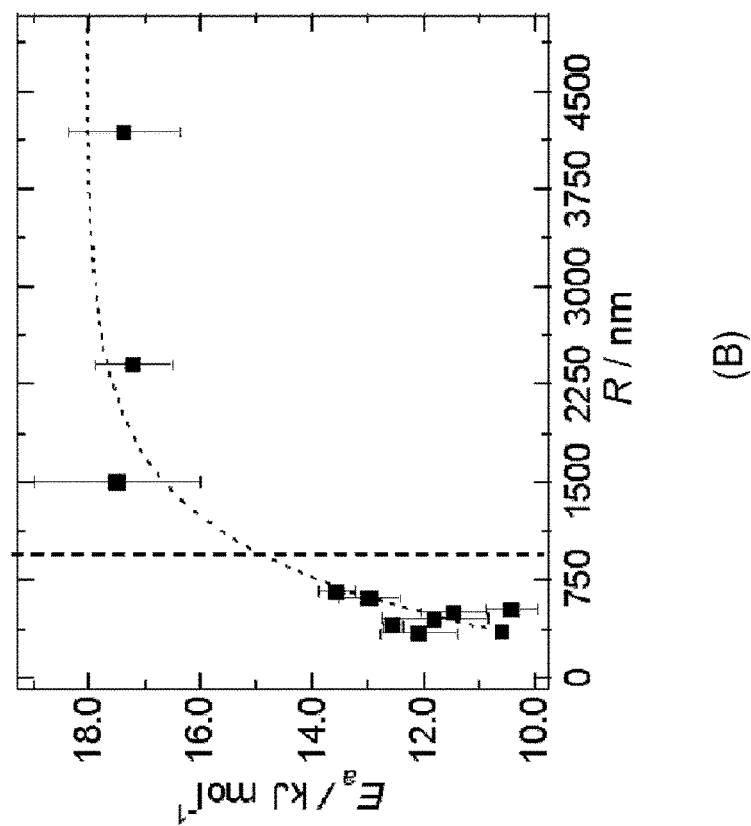
FIG. 5 shows graphs showing results from investigation of the inverse of spin-lattice time, which is an indicator of the mobility of water molecules, (FIG. 5(A)) and the activation energy for hydrogen bond recombination (FIG. 5(B)) in the case that a channeling (channel) having a rectangular cross-section of R (nm)×R (nm) is formed in a base made of fused silica glass having proton-donative functional groups on the surface.
Figure 5:
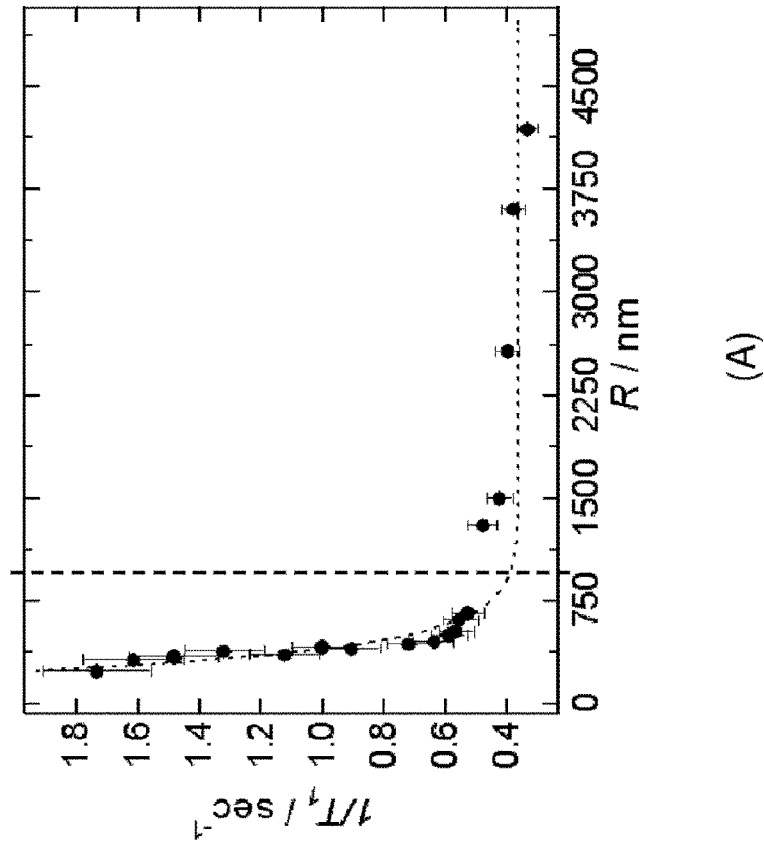

FIG. 5 shows graphs showing results from investigation of the inverse of spin-lattice time, which is an indicator of the mobility of water molecules, (FIG. 5(A)) and the activation energy for hydrogen bond recombination (FIG. 5(B)) in the case that a channeling (channel) having a rectangular cross-section of R (nm)×R (nm) is formed in a base made of fused silica glass having a proton-donative functional groups on the surface.

The results shown in these figures suggest that a hydrogen bond network among water molecules in the nano channel is formed to significantly decrease the mobility of water molecules in a region in which the R value is 800 nm or less, which corresponds to the distance d between the main surface of the first base and the main surface of the second base (FIG. 5(A)). As a result, the activation energy for proton transfer through hopping between water molecules via hydrogen bond recombination significantly decreases (FIG. 5(B)).

If a configuration, in which this channeling size effect and the above-described effect of increasing the proton conduction efficiency by negative charges formed on the base main surface are simultaneously achieved, is employed, a proton conductor having a significantly enhanced proton conductivity can be achieved. As described above, the "high-speed transfer region" formed in the vicinity of the surface of the proton-donating layer has a thickness corresponding to a layer of roughly 100 molecules (approx. 50 nm), and thus the R value, which corresponds to the distance d between the main surface of the first base and the main surface of the second base, is preferably 50 nm or less.

Accordingly, it follows that the proton conductor according to the present invention may be, in an embodiment, a proton conductor including: a first base having a negative charge formed on a main surface thereof; a first proton-donating layer provided on the main surface of the first base; a second base having a main surface facing the main surface of the first base, the second base having a negative charge formed on the main surface thereof; and a second proton-donating layer provided on the main surface of the second base, where the distance d between the main surface of the first base and the main surface of the second base is 50 nm or more and 800 nm or less.

Figure 6:
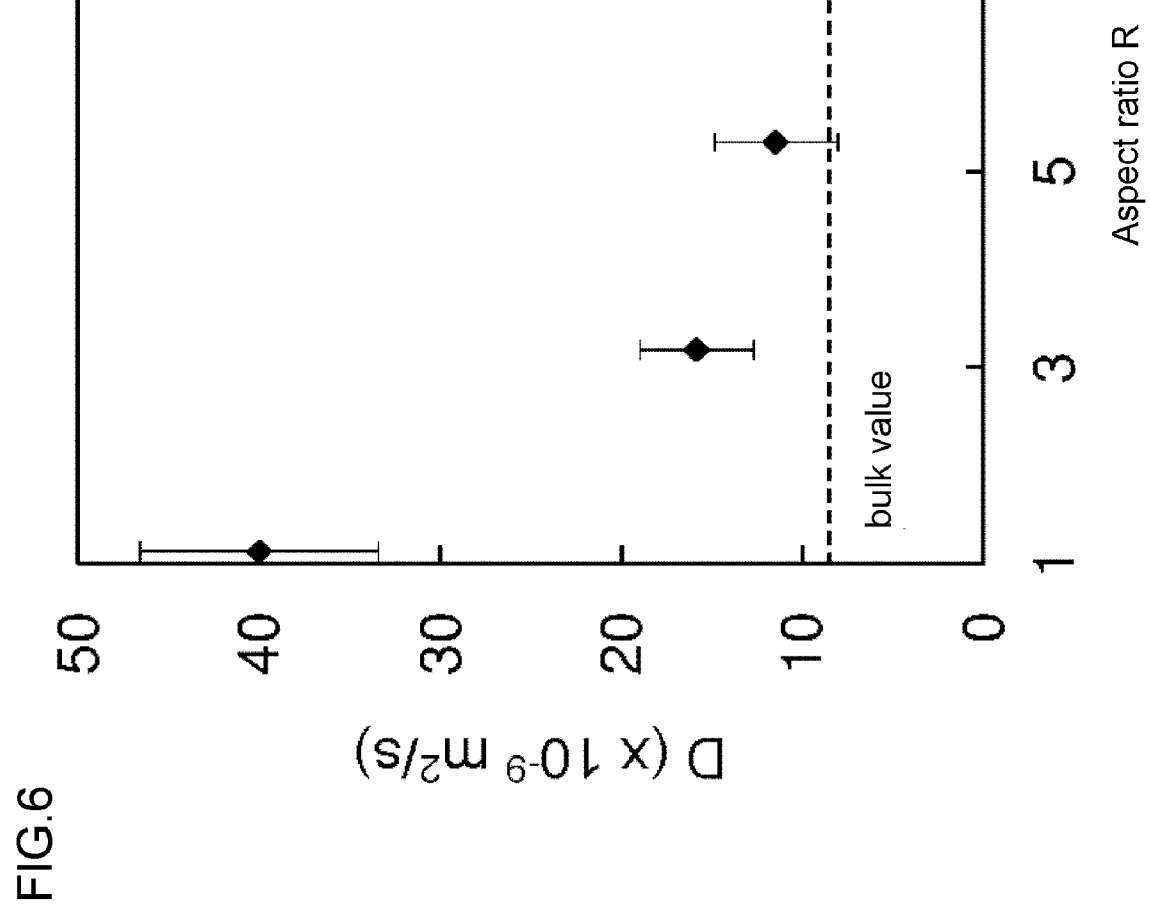
FIG. 6 shows results from investigation of the aspect ratio (R=L/d)-dependency of the proton diffusion coefficient in a nano channel in one embodiment, the nano channel being formed with the proton conductor according to the present invention.

FIG. 6 shows results from investigation of the aspect ratio (R=L/d)-dependency of the proton diffusion coefficient in a nano channel with a rectangular cross-section, the nano channel being further formed in the above configuration and including two side walls perpendicular to the main surface of the first base and the main surface of the second base, where L is the distance between the two side walls.

Four nano channels with its similar height (depth: d) of 170 nm and a different side wall distance L were fabricated, and the proton diffusion coefficient D was measured at aspect ratios (R=L/d) between 1 and 11.

Note, all the nano channels used in these experiments included a silicon oxide layer as a proton-donating layer on the surface of each of the two side walls.

The proton diffusion coefficient of the nano channel at aspect ratio R of 11 was equal to the bulk aqueous solution region. For the nano channels with aspect ratio R~6 or less the proton diffusion coefficient was significantly higher as the aspect ratio R was smaller. Accordingly, the aspect ratio defined as in the above is preferably 6 or smaller in the case that the proton conductor according to the present invention is used for a nano channel.

The proton conductor according to the present invention as described above is particularly suitable for a fuel cell application, especially including the proton conductor as an aqueous solution channel.

In forming such an aqueous solution channel, although the method therefor is not limited, the aqueous solution channel can be formed as in the following for example.

FIG. 7 illustrates an example of a process for forming an aqueous solution channel with the proton conductor according to the present invention.

First, a glass substrate is subjected to nano channel processing (S101), and an $SiO_2$ thin film is formed on an LN substrate as the other substrate by a sputtering method (S102). The main surfaces of these substrates are subjected to surface activation treatment (S103), and thereafter the main surfaces are bonded together (S104).

Here, the thermal expansion coefficients of the glass and the LN substrates are differ by approximately two orders of magnitude, and thus, if the substrates are thermally fused together at a higher temperature of 1000° C., break or warpage of the substrates or deformation of the channel, etc., can be happened due to thermal strain in returning to room temperature. Due to these problems in the differences of materials thermal expansion properties, it is preferred to perform oxygen plasma treatment for the main surface of each of the substrates for surface activation in the step S103 and then laminate the substrates (S104). If a pressure of approximately 5000 N is applied and retained at room temperature for approximately 6 hours in the lamination (joint) in the step S104, a joint surface having a sufficient strength can be obtained. It is not necessary to perform the above surface activation treatment for the main surfaces of both substrates, and the surface activation treatment may be performed for the main surface of any one of the substrates.

FIG. 8 illustrates another example of a process for forming an aqueous solution channel with the proton conductor according to the present invention. In this example, each of the first substrate and the second substrate is lithium niobate (LN) as a ferroelectric crystal. It follows that the main surface section of the first base and the main surface section of the second base are both LN as a ferroelectric crystal in this embodiment.

First, LN substrate is subjected to nano channel processing (S201), and an $SiO_2$ thin film is formed on the main surface of each LN substrates by a sputtering method (S202). Experimental conditions for $SiO_2$ films is now constant with film thickness 5 nm, substrates bonding is preferable under such thickness. Subsequently, the main surfaces of these LN substrates are subjected to surface activation treatment (S203), and thereafter the main surfaces are bonded together (S204).

Although the thermal expansion coefficients of the substrates are not different in this embodiment, it is preferred to laminate at a temperature as low as possible to avoid any break, warpage or deformation of the channel, etc., due to thermal strain during bonding process. Also in this embodiment, it is preferred to perform oxygen plasma treatment for the main surface of each of the substrates for surface activation in the step S203 and then laminate the substrates (S204). If a pressure of approximately 5000 N is applied and retained at room temperature for approximately 6 hours in the lamination (joint) in the step S204, as described above, a joint surface having a sufficient strength can be obtained. It is not necessary to perform the above surface activation treatment for the main surfaces of both substrates, and the surface activation treatment may be performed for the main surface of any one of the substrates.

In the embodiment illustrated in FIG. 8, the main surface region of the first LN substrate is partially removed by etching for nano channel processing. However, it is not required to employ such processing, and for example, the following procedure may be employed: first, a thin film of silicon, etc., is formed on the main surface of a first LN substrate (FIG. 9(a)); then the thin film is partially removed by etching, etc., for nano channel processing (FIG. 9(b)); and subsequently an $SiO_2$ thin film is formed (FIG. 9(c)).

As described hereinbefore, the present invention allows protons in the channel to localize in the vicinity of the wall and enables transport of protons only in regions of structured water. Thereby, the proton conductivity in the nano channel can be significantly increased.

In addition, the usage of such a proton conductor as an aqueous solution channel provides a fuel cell as a next-generation power source with low environmental load and high efficiency.

The above-described proton conductor can be also summarized as a proton conductor having the following configurations.

A proton conductor including: a first base having a negative charge formed on a main surface; a first proton-donating layer provided on the main surface of the first base; a second base having a main surface facing the main surface of the first base, the second base having a negative charge which is formed on the main surface; and a second proton-donating layer provided on the main surface of the second base, where the distance d between the main surface of the first base and the main surface of the second base is 50 nm or more and 800 nm or less.

In the proton conductor, each of the first proton-donating layer and the second proton-donating layer is preferably a layer having a proton-donative functional group on the surface.

The proton-donative functional group is preferably any one of a silanol group, a phosphate group, a titanol group, and a sulfone group.

Each of the first proton-donating layer and the second proton-donating layer is preferably a silicon oxide layer.

The thickness of the silicon oxide layer is preferably 20 nm or less.

In a preferred embodiment, at least one of the main surface sections of the first base and the second base comprises an electrode surface or a ferroelectric crystal, or each of the main surface sections of the first base and the second base comprises a ferroelectric crystal.

In this case, the ferroelectric crystal lithium niobate as example.

As a preferred embodiment, the proton conductor may include two side walls perpendicular to the main surface of the first base and the main surface of the second base in such a way that the aspect ratio defined as R=L/d is 6 or less, where L is the distance between the two side walls.

Each of the two side walls preferably includes a proton-donating layer on the surface.

Further, the above-described proton conductor may be used to form a fuel cell including the proton conductor as an aqueous solution channel.

INDUSTRIAL APPLICABILITY

The present invention provides a proton conductor which allows highly effective proton transport in a nanospace, and a fuel cell including the proton conductor as an aqueous solution channel.

REFERENCE SIGNS LIST 10a first base
10b second base
20a first proton-donating layer
20b second proton-donating layer
30 protic solvent

The invention claimed is:

1. A proton conductor, comprising:
a first base having a negative charge formed on a main surface; and a first proton-donating layer provided on the main surface of the first base;
a second base having a main surface facing the main surface of the first base, the second base having a negative charge which is formed on the main surface of the second base; and
a second proton-donating layer which provided on the main surface of the second base,
wherein a thickness of the first proton-donating layer is 20 nm or less, a thickness of the second proton-donating layer is 20 nm or less, and a distance d between the main surface of the first base and the main surface of the second base is 50 nm or more and 800 nm or less;
wherein a channel for a protonic solvent is served by the space between the first base and second base.

2. The proton conductor according to claim 1, wherein the first proton-donating layer is a layer having a proton-donative functional group on a surface.

3. The proton conductor according to claim 2, wherein the proton-donative functional group is any one of a silanol group, a phosphate group, a titano group, and a sulfone group.

4. The proton conductor according to claim 1, wherein the first proton-donating layer is a silicon oxide layer.

5. The proton conductor according to claim 1, wherein the second proton-donating layer is a layer having a proton-donative functional group on a surface.

6. The proton conductor according to claim 5, wherein the proton-donative functional group is any one of a silanol group, a phosphate group, a titanol group, and a sulfone group.

7. The proton conductor according to claim 1, wherein the second proton-donating layer is a silicon oxide layer.

8. The proton conductor according to claim 1, wherein at least one of the main surface sections of the first base and the second base comprises an electrode surface or a ferroelectric crystal.

9. The proton conductor according to claim 1, wherein each of the main surface sections of the first base and the second base comprises a ferroelectric crystal.

10. The proton conductor according to claim 8, wherein the ferroelectric crystal is lithium niobate.

11. The proton conductor according to claim 1, comprising two side walls perpendicular to the main surface of the first base and the main surface of the second base in such a way that an aspect ratio defined as R=L/d is 6 or less, wherein L is a distance between the two side walls.

12. The proton conductor according to claim 11, wherein each of the two side walls includes a proton-donating layer on a surface thereof.

13. A fuel cell, comprising the proton conductor according to claim 1 as an aqueous solution channel.

14. The proton conductor according to claim 9, wherein the ferroelectric crystal is lithium niobate.

* * * * *